Figure 1:
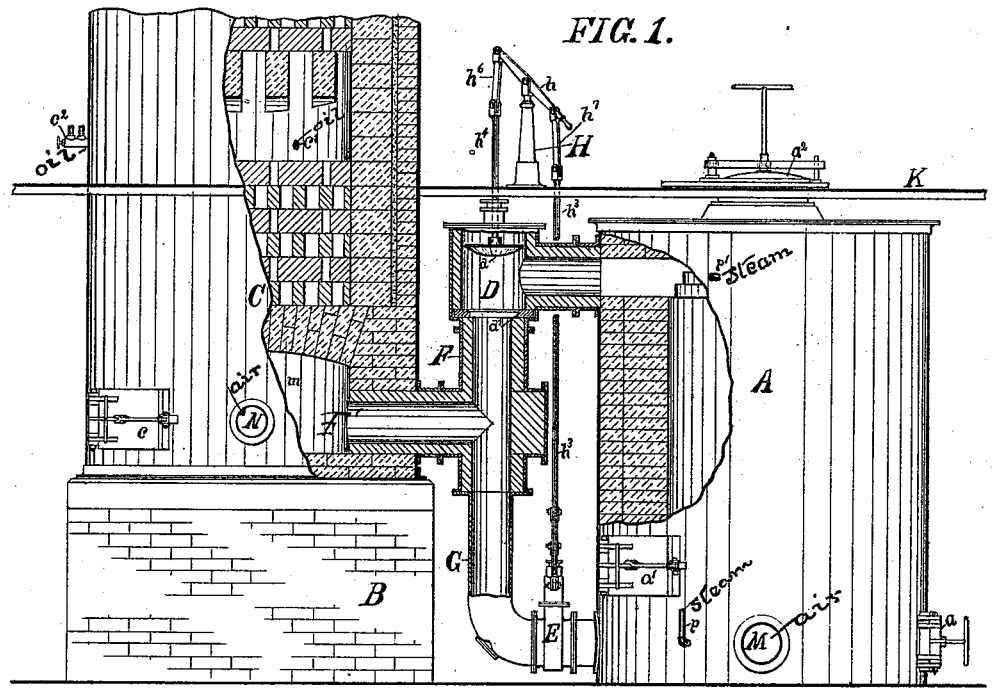

(No Model.) 2 Sheets—Sheet 1.
O. N. GULDLIN.
COMBINATION VALVE CONNECTION FOR WATER GAS APPARATUS.
No. 510,506. Patented Dec. 12, 1893.

WITNESSES: Geo. F. Felts R. S. Robertson

INVENTOR Olaf N. Guldlin BY Chapin & Denny his ATTORNEYS.

THE NATIONAL LITHOGRAPHING COMPANY,
WASHINGTON, D. C.

(No Model.) 2 Sheets—Sheet 2.

O. N. GULDLIN.
COMBINATION VALVE CONNECTION FOR WATER GAS APPARATUS.

No. 510,506. Patented Dec. 12, 1893.

WITNESSES: Geo. F. Felts R. S. Robertson

INVENTOR Olaf N. Guldlin BY Chapin & Denny his ATTORNEYS.

UNITED STATES PATENT OFFICE.

OLAF N. GULDLIN, OF FORT WAYNE, INDIANA.

COMBINATION-VALVE CONNECTION FOR WATER-GAS APPARATUS.

SPECIFICATION forming part of Letters Patent No. 510,506, dated December 12, 1893.

Application filed May 9, 1892. Serial No. 432,228. (No model.)

*To all whom it may concern:*

Be it known that I, OLAF N. GULDLIN, a citizen of the United States, residing at Fort Wayne, in the county of Allen and State of Indiana, have invented certain new and useful Improvements in Combination-Valve Connections for Water-Gas Apparatus; and I do hereby declare that the following is a full, clear, and exact description of the invention, which will enable others skilled in the art to which it appertains to make and use the same, reference being had to the accompanying drawings, which form part of this specification.

My invention relates to improved means of connection between the generator and superheater of a water gas apparatus and may be regarded as an improvement upon the apparatus shown and described in United States Letters Patent No. 274,637, issued to Frank D. Moses, March 27, 1883, for improvements in the "Process of manufacturing illuminating and heating gas and the apparatus therefor," though it may be used with any water gas apparatus having the generator and superheater in separate shells.

None of the forms of apparatus now in use for the manufacture of water gas for heating and illuminating purposes, in which the furnace or generator and the superheater are in separate shells, has any means for sending the steam either up or down through the incandescent fuel of the generator, or more properly for making both up and down runs at will.

The object therefore of my invention is to provide a combination valve connection for use with the generator and superheater of a water gas apparatus, so constructed and arranged that when in position, such a connection may be readily and conveniently established and regulated between the upper and lower part of the generator and the combustion chamber of the superheater that the gases resulting from the passing of steam through the incandescent fuel body, can be passed into the superheater from either above or below the fuel bed of the generator, thus permitting the operator to make up and down runs at pleasure; and so arranged that the principal volume of gas may be made by down runs while only an occasional up run is made to break up the clinker and cool the grate, &c., thereby insuring greater fuel economy.

A further object of my invention is to provide a combination valve connection, so balanced as to be promptly and conveniently adjusted, and so arranged that the valves which close said openings from the generator to the superheater, can not be both closed at the same time, as by my improvement the closing of one valve will automatically open the other, thus insuring the safety of both operator and apparatus at all times.

My invention consists of the novel construction and combinations of the several parts as will be hereinafter set forth and particularly pointed out in the claims.

The object of my invention is accomplished by the mechanism illustrated in the accompanying drawings forming part of this specification in which similar letters of reference indicate corresponding parts in all the views.

Figure 2:
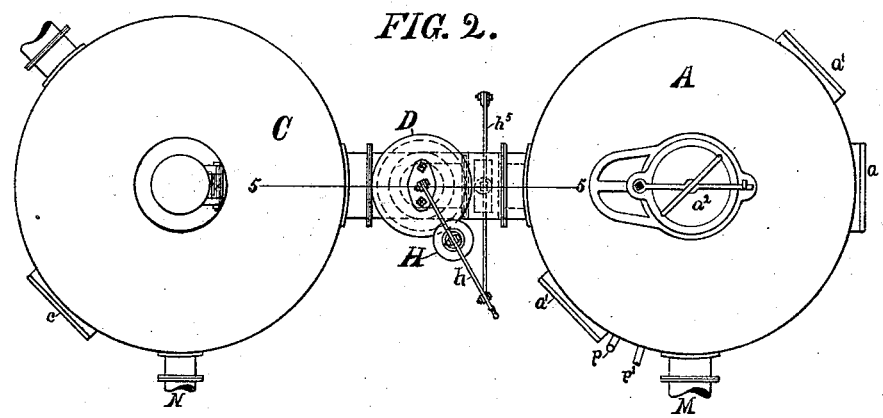
Figure 3:
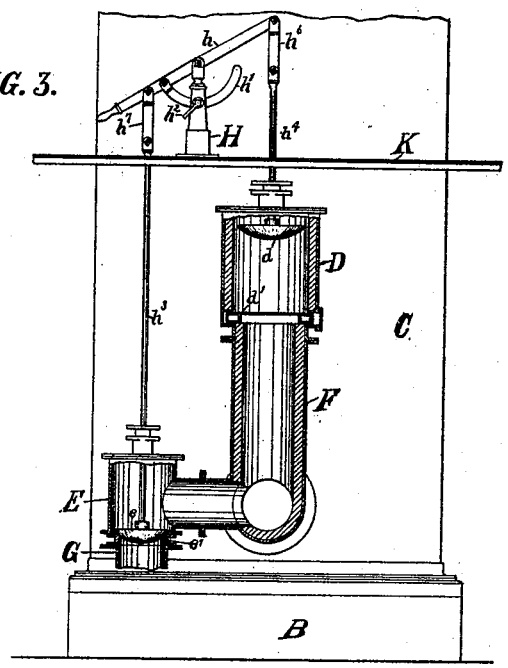
Figure 4:
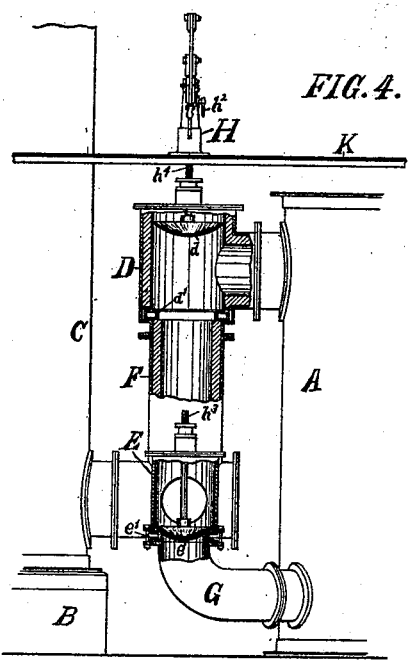
Figure 5:
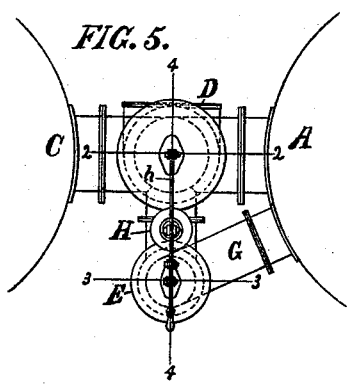

Figure 1 is a side elevation of the generator and superheater of the well known Lowe apparatus, in section, with my improvement in position therein, only so much of the superheater being shown as is necessary to show the connection of my improvement therewith. Fig. 2 is a plan view of the same. Fig. 3 is a vertical section of my improvement on the line 4—4 of Fig. 5 looking toward the superheater C. Fig. 4 is a vertical section of the same on the lines 2—2 and 3—3 of Fig. 5. Fig. 5 is a plan view of Figs. 3 and 4.

Referring now to Fig. 1, A is a furnace or primary gas generator of suitable material, properly lined and of well known construction, provided with an opening M for blast pipe an ash pit door $a$, grate doors $a'$, charging doors $a^2$ and suitable steam pipes $p$ and $p'$ above and below the fuel and fire grate, all constructed and arranged in a well known manner.

C is a superheater of any suitable and approved construction, having a proper base B, an opening N for the blast pipe a suitable door $c$, an opening $c'$ through which oil may be injected and a suitable injector $c^2$ for hydrocarbon oils, of which a suitable number may be used at any desired point or points.

The tubular valve chamber D of suitable material and properly lined with fire brick or other refractory materials is connected in a proper manner with the generator A and also with the superheater C by the pipe F and branch F' which are also suitably lined. A second valve chamber E, as seen in Figs. 3 and 4, is also connected with the generator A by means of pipe G and with the superheater by branch pipe F'.

Valve chamber D is provided with a circular valve seat $d'$ preferably of cast iron, seen in Figs. 1, 3 and 4.

The lower valve chamber E not being subjected to the same degree of heat as chamber D is preferably not provided with fire brick lining, and the valve seat $e'$ for the same reason is simply a ring having its upper and lower surfaces suitably flanged which give a large exterior surface readily cooled by the air; said valve seat being secured in position by proper bolts as seen in Fig. 4, though the form of valve seat used in chamber D may also be used in chamber E if desired. The valve seat $e'$ may also be readily removed or replaced by removing said bolts.

Upon the operating floor K is secured, in any suitable manner, a stand or standard H, upon which is properly mounted or pivoted the balanced lever $h$, having a handle for operating the same and a quadrant or circular guide $h'$ which plays in a suitable slot in standard H and may be securely locked in any desired position by a lock screw $h^2$ or other equivalent device, as seen in Fig. 3.

At suitable points on the balanced lever $h$ are properly secured the valve rods $h^3$ and $h^4$ which pass into valve chambers E and D respectively, and to the lower ends of which are properly secured the ball or disk valves $e$ and $d$ respectively. The rods $h^3$ and $h^4$ are united to lever $h$ by suitable links $h^7$ and $h^6$ to facilitate the perpendicular movement of said valve rods.

The valve $d$ is preferably a solid metallic ball or disk or other suitable form to stand the heat, and adapted to snugly fit the valve seat $d'$ and securely close the opening in the same, but said valve may also be made hollow to permit cooling with water or steam if desirable. Valve $e$ may also be constructed as a ball or disk, though for economy of construction, a quick opening gate valve, of well known construction, connected to valve rod $h^3$ by its valve lever $h^5$ or other suitable manner, may be substituted for the ball or disk valve above described.

The operation of my improved combination valve connection for water gas apparatus, above described is as follows: When it is desirable to blow up a heat the lower valve is closed by lowering the handle of lever $h$. This movement will raise valve $d$ and allow a free passage for the blast gases between the upper part of the generator A and the combustion chamber $m$ of the superheater C, as seen in Fig. 1, and the valves are then secured in that position by the lock screw $h^2$. The same arrangement of valves is made when the steam is admitted below the grate of the generator for an up run through pipe $p$ in the usual manner; but when the steam is admitted through pipe $p'$ in the generator A for a down run, valve $e$ is opened by elevating the handle of lever $h$, which movement will at the same time automatically close valve $d$, thus forcing the steam down through the bed of incandescent fuel in the generator A and out through the open valve $e$.

My combination valve connection is also applicable to water gas apparatus not requiring any superheater, but where it is desirable to utilize the blast gases for combustion in a vertical boiler or other furnace as well as utilizing the sensible heat of the water gas in a boiler or other heater for absorbing the same. It will thus be seen that by the use of my improvement up and down runs can be made at pleasure; the operation of opening and closing the valves can be made with ease, promptness and safety by means of the balanced lever $h$; no oversight or neglect on the part of the operator can endanger the apparatus by inadvertently closing both valves at the same time; great economy of fuel is secured by closing valve $d$ and sending the steam down through the fuel of the generator, instead of deadening the fire by the usual method; and the principal volume of gas can be made by down runs, with only an occasional up run being required to cool the grates and break up the clinkers.

I am aware that up and down runs can be made, as above described, in that form of water gas apparatus in which the generator and superheater are inclosed in one shell, but no means have ever been invented of which I am aware for connecting the generator and superheater of a water gas apparatus when the same are in separate shells, as in the well known Lowe apparatus, by a combination valve involving the use of two ball or disk valves operated by a balanced hand lever, and an adjustable valve seat which can be readily removed or replaced when desired. Therefore

What I claim as new and useful, and desire to secure by Letters Patent, is—

1. The combination with a gas generating furnace, having steam supply pipes $p$ and $p'$, respectively at bottom and top, and a superheater having a combustion chamber of gas escape pipes F and G, connecting respectively at top and bottom of the generator and with the superheater and provided with valve casings as D and E, and balanced valves, as $d$ and $e$, rods for said valves, and a centrally pivoted lever pivotally connected at its opposite ends to said rods and located above both valves, so that the weight of one counterbalances the weight of the other, substantially as described.

2. The combination with a gas generating furnace, having steam supply pipes at top and bottom, and a superheater, having a combustion chamber, of gas escape pipes F and G, having valve chambers D and E, connecting respectively at top and bottom of the generator and with the superheater and provided with balanced valves as $d$ and $e$, rods for said valves, a stand H, located above the valves and having pivoted thereto a balanced hand-lever, which lever is also pivotally connected at or near its opposite ends to said valve rods, said stand and hand lever also being provided with a quadrant or circular guide, having a locking device, substantially as described.

Signed by me this 6th day of May, 1892.

OLAF N. GULDLIN.

Witnesses:
 R. S. ROBERTSON,
 A. P. BUCHMAN.